Aug. 25, 1959 C. ZELNICK 2,900,733
INDICATORS WITH RESILIENT MEANS FOR REVERSING
THE BIAS OF THE OPERATING SPINDLE
Filed May 4, 1955 2 Sheets-Sheet 1

*INVENTOR.*
CHARLES ZELNICK

BY

ATTORNEYS

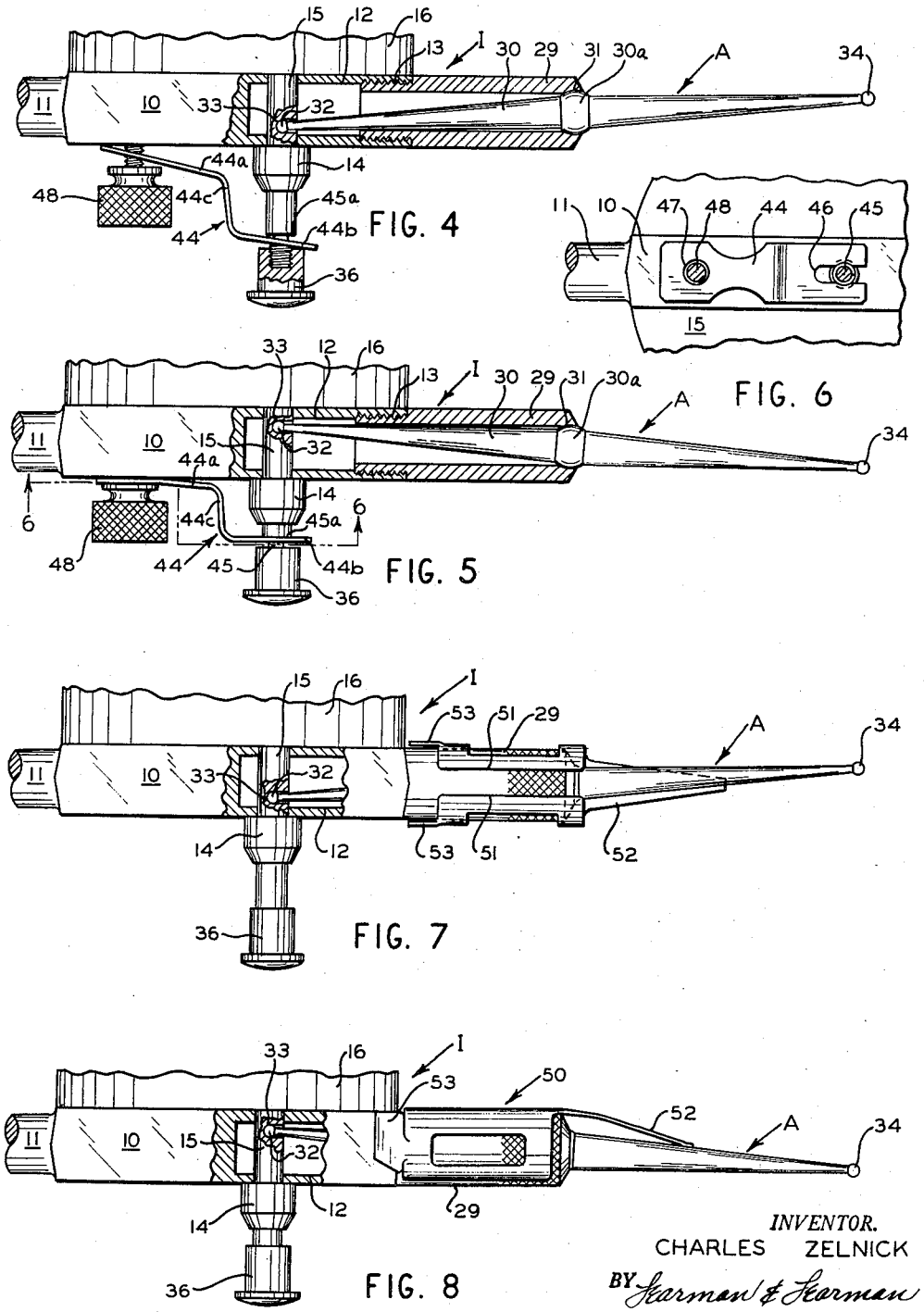

United States Patent Office 2,900,733
Patented Aug. 25, 1959

2,900,733

INDICATORS WITH RESILIENT MEANS FOR REVERSING THE BIAS OF THE OPERATING SPINDLE

Charles Zelnick, Saginaw, Mich., assignor to The Lufkin Rule Company, Saginaw, Mich.

Application May 4, 1955, Serial No. 506,003

10 Claims. (Cl. 33—172)

This invention relates generally to indicators and more particularly to indicators which incorporate means for selectively varying the resiliently maintained position of the attachment arm and spindle thereof.

An indicator of the type to which I refer is shown and described in my co-pending application Serial No. 477,811, in which resilient means within the indicator may be employed to maintain the indicator plunger selectively in either "in" or "out" position so that the attachment arm may be used to check oppositely disposed surfaces without inverting the indicator. Indicators of the above design have enjoyed a very favorable reception in the trade and many experimental hours have been devoted to the possibility of converting the many thousands of indicators which are presently in use without undue expense so that they may become capable of performing the same operation. Obviously, it would not be practical to call in these indicators and outfit them with means such as outlined in the co-pending application, however as will become apparent the means which I have perfected, and which form the subject matter of the instant application, can be very easily applied to existing indicators by the purchasers thereof.

One of the prime objects of the instant invention is to design readily applied means such as described which are effective and reliable in operation and permit an operator to check a surface which is opposed to a surface just checked, such as an opposite marginal side wall of a groove or slot, without substantially changing the position of the indicator and losing the general locating position thereof. With an indicator which can be converted at will it will obviously never be necessary to read an indicator dial from underneath.

A further object of the invention is to provide means of the type described which can be very readily disengaged when desired to permit the indicator to be operated in the usual manner.

Another object of the invention is to provide an indicator of this type which can be readily disassembled when necessary to permit the replacement of parts and particularly the resilient means for overcoming the conventional plunger biasing spring.

A further object of the invention is to design an indicator as described in which the means for overcoming the conventional indicator spring may be removably secured in position, but will not be readily disturbed by inadvertent jarring of the indicator or the like.

Another object of the invention is to design an indicator which is provided with means such as described for reversing the loading of the attachment arm with a biasing force equivalent to that of the spring which disposes the arm in its usual locating position.

A still further object of the invention is to provide indicator attachment arm reversing means of rugged and durable construction which is extremely simple and practical in design and can be very economically manufactured on a quantity production basis.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

In the drawings:

Fig. 4 is a view similar to Fig. 1 illustrating another embodiment of the invention applied to the indicator.

Fig. 5 is a view similar to Fig. 2 with the reversing means of Fig. 4 holding the spindle similarly in "in" position.

Fig. 6 is an inverse, plan sectional view taken on the line 6—6 of Fig. 5.

Fig. 7 is a view similar to Fig. 4 illustrating still a further embodiment of the invention.

Fig. 8 is a view similar to Figs. 2 and 5 showing the spindle held in "in" position.

Figure 1:
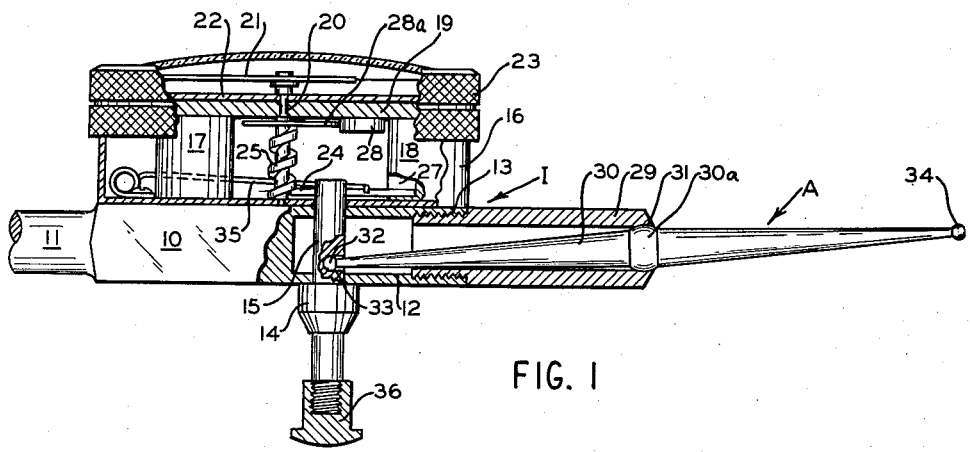
Fig. 1 is a partly sectional, side elevational view of a conventional indicator with the plunger or spindle in normal "out" position.

Referring now to the accompanying drawings wherein I have shown preferred embodiments of my invention and particularly to Fig. 1 thereof, a letter I generally indicates a conventional indicator such as disclosed in Patent No. 2,345,845 issued April 4, 1944, to Earl J. Wells. This indicator which has been widely advertised and sold includes a base 10 with an integrally formed extension or shank 11 projecting from one end thereof to facilitate mounting the instrument adjacent the surface to be checked. The opposite end of the base is provided with a bored opening 12 which is interiorly threaded as at 13 to receive an inside attachment A in the usual manner. Supported in a bearing 14 on the base 10 is the conventional plunger or operating spindle 15 which as shown extends through the base 10 at substantially right angles to the attachment A and into an annular dial casing 16 which is supported on the base 10 to enclose certain of the operating elements of the indicator. Spacer posts 17 and 18 within the casing 16 support a plate 19 in which is journaled an indicator shaft 20 provided with a pointer 21 on the upper end thereof. A dial 22 which is suitably graduated in the usual manner is carried by the bezel and crystal assembly 23 which is rotatably mounted on the casing 16 so that the circumferential position of the dial may be adjusted relative to the pointer 21. Provided on the inner end of the plunger 15 is a transverse pin 24 which has operative engagement with a worm cam 25 formed on a lower extension of the shaft 20. The opposite end of the pin 24 extends into a slot or groove 27 formed in the fixed post 18 and it will be apparent that axial movement of the plunger or spindle 15 will revolve the shaft 20, while the plunger itself is prevented from rotating by the disposition of the pin 24 in the groove 27. The worm cam 25 is, of course, so pitched that the exact lineal movement of the plunger 15 is accurately represented by the movement of the pointer 21 relative to the dial 22. Depending from the plate 19 in position to be engaged by the end of the plunger 15 is a stop member 28 which limits inward movement of the plunger 15 and thereby rotation of the shaft 20, and a hair spring 28a which maintains the cam 25 in engagement with the pin 24 is connected to the stop 28 and shaft 20 as usual.

The inside attachment A comprises the tubular support or sleeve 29 with the attachment arm or finger 30 swivelly mounted in a socket 31 formed in the outer end thereof. The arm 30 conventionally is enlarged intermediate its ends to form a ball joint 30a which swivels in the socket 31 and further has a ball 32 on its inner end which is received in the socket 33 provided in the plunger 15. The outer end of the arm 30 has a contact ball 34 thereon, and when the arm is pivoted in the axial plane of movement of the plunger by an irregularity in a surface being checked, clearly the plunger is moved axially to rotate the shaft 20 in accordance with the degree of pivot of the arm 30 and the pointer 21 will register the reading.

Figure 2:
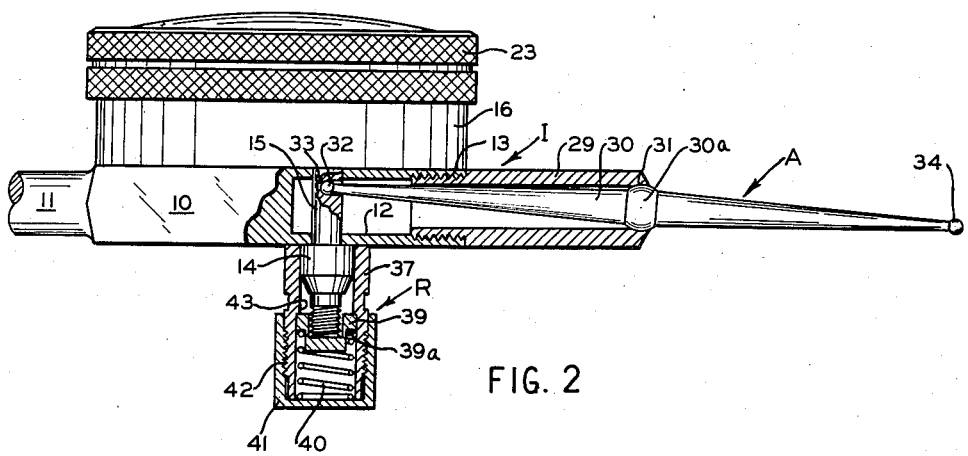
Fig. 2 is a similar view showing spring load reversing means applied to the spindle of the indicator to bias the plunger in the opposite direction.

The elements thus far described are conventional and generally a spring member 35 hooked over the pin 27 has been employed to load the plunger 15 so that it is normally disposed in the "out" position in which it is shown in Fig. 1. If the cap 36 which is threaded on the end of the spindle 15 is removed a reversing attachment R may be slipped over the bearing 14 as shown in Fig. 2. This attachment R comprises a sleeve 37 with an end which is split as at 38 so that the end of the sleeve may expand when it is pressed over the bearing 14. Mounted within the sleeve or cylinder 37 is a plunger 39 which is shouldered as at 39a to receive a coil spring 40 which requires a force approximately equal to twice the force required to push the plunger 15 inwardly against the spring 35 to compress it. A cap 41 which is threaded on the sleeve as at 42 holds the spring in engagement with the plunger 39, and it will be seen that the interior wall of the sleeve 37 is shouldered as at 43 to prevent inward displacement of the plunger beyond a predetermined point.

Figure 3:
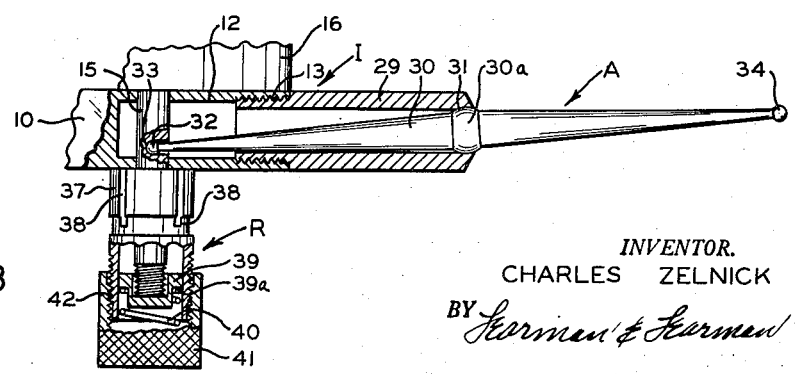
Fig. 3 is a similar, but fragmentary view showing the means withdrawn from the spindle sufficiently so that the plunger and attachment arm are in normal position.

When the attachment R is fitted on the bearing 14, plainly the plunger 39 forces the spindle 15 inwardly to the position in which it is shown in Fig. 2 since the leg of the spring 35 is much easier to force inwardly than the spring 40 is to compress. By providing a spring 40 which is approximately twice as hard to displace as the spring 35, the spindle is loaded in the reverse direction with a force equivalent to the normal load which biases the spindle as in Fig. 1. When it is desired to return the spindle to "out" position the cap 40 may simply be backed off to the position in which it is shown in Figure 3.

In Figs. 4–7 I have shown a further embodiment of the invention in which a generally Z-shaped spring 44, whose legs 44a and 44b normally form an obtuse angle with respect to the reduced intermediate portion 44c of the spring which connects them (see Fig. 4), is mounted on the indicator (see Figs. 4 and 5). In this modification the outer end of the spindle is reduced as at 45 to form the shoulder 45a and the leg 44b of the spring steel member 44 is bifurcated as at 46 to snugly receive the reduced portion 45 of the spindle as shown. The opposite leg 44 has an opening 47 provided therein and a screw 48 threaded in the base 10 of the indicator as shown, is adapted to secure this end of the spring 44.

In order to reverse the normal position of the spindle 15 (see Fig. 4), it is merely necessary to tighten down the screw 48 which deforms the spring 44 and forces the spindle 15 inwardly. The force with which the spring 44 holds the spindle in its "in" position will be approximately double the force required to press the end of the spring 35 inwardly. To normally bias the arm 30 once again the screw 48 need, of course, only be backed off to the position in which it is shown in Fig. 4.

A still further embodiment of the invention is shown in Figs. 7 and 8 in which a cylindrical clip 50, split as at 51 is mounted on the barrel 29 of the indicator. The flexible spring leg 52 thereon extends beyond the axis of the clip 50, and when the clip is applied to the barrel as in Fig. 8 reverses the position of the attachment arm 29. Provided on the end of the clip opposite the leg 52 are flat extension tabs 53 which are shown disposed in Fig. 8 on opposite flat sides of the base 10 of the indicator and prevent any inadvertent rotation of the clip which would disturb the bias of the arm A.

To return the attachment arm 29 to normal position, the clip may be moved outwardly until the tabs 53 clear the base 10 and thence rotated through an angle of 180° to the position in which it is shown in Fig. 7. In this latter position the force of both the spring leg 52 and spring 35 tend to maintain the arm 29 in normal position, but in many cases it will be desirable to remove the clip entirely. The force required to displace the leg 52 is similarly roughly twice that required to depress the spring arm 35.

It should be apparent that I have perfected very novel means for reversing the position of a resiliently maintained indicator attachment arm which can be very readily applied to conventional indicators without any substantial change in their present design. It will be understood that various changes may be made in the various elements which comprise the invention without departing from the spirit thereof or the scope of the appended claims.

I claim:

1. In a dial indicator: a gauge casing; a spindle reciprocable in said casing, indicator means in said casing associated with said spindle movable in ratio to the movement of said spindle; a spring in said casing normally maintaining said plunger at substantially one limit of its travel; and disengageable spring means supported externally by the casing, in one position engaging said plunger with sufficient force to overcome said first spring means and maintaining said spindle at substantially the opposite limit of its travel, said disengageable spring means comprising a spring retaining member mounted on said casing around said spindle, and a spring pressed plunger in said spring retaining member in bearing engagement with the end of said spindle.

2. In a dial indicator: a gauge casing; a spindle reciprocable in said casing; indicator means in said casing associated with said spindle movable in ratio to the movement of said spindle; a spring in said casing normally maintaining said plunger at substantially one limit of its travel; and disengageable spring means supported externally by the casing in one position engaging said plunger with sufficient force to overcome said first spring means and maintaining said spindle at substantially the opposite limit of its travel, said disengageable spring means comprising a leaf spring connected to said casing and having an extending end bearing on said spindle.

3. In a dial indicator: a gauge casing; a spindle reciprocable in said casing; indicator means in said casing associated with said spindle movable in ratio to the movement of said spindle; a spring in said casing normally maintaining said plunger at substantially one limit of its travel; an attachment arm swivelly supported by said casing interjacent its ends, having one end thereof operably connected to said spindle; and disengageable spring means supported externally by the casing in one position exerting a sufficient force to overcome said first spring means and maintain said spindle at substantially the opposite limit of its travel, said disengageable spring means comprising a clip mounted on said casing and having an extending spring leg pressing against the opposite end of said attachment arm to reverse the position of the spindle.

4. In a measuring instrument: a gauge casing; a spindle movable in a defined path into said casing and having an "in" position defining one limit of travel and an "out" position defining the other limit of travel; indicator means associated with said spindle, movable in ratio with the movement thereof; spring means bearing on said spindle to hold it in "out" position; attachment means including a resilient element and supported by the casing, in one position acting on the plunger in opposition to said spring to overcome the spring and hold the spindle in "in" position; an exterior bearing for said spindle provided on the exterior of said casing and from which said spindle extends outwardly, said last means including a sleeve having an expansible end snugly fitting on said bearing; a spring retained plunger in said sleeve forcing said spindle inwardly; and means adjustable to relieve the pressure of said plunger on said spindle so that said spindle may return to "out" position.

5. In a measuring instrument: a gauge casing; a spindle movable in a defined path into said casing and having an "in" position defining one limit of travel and an "out" position defining the other limit of travel; indicator means associated with said spindle movable in ratio with the movement thereof; spring means bearing on said spindle to hold it in "out" position; an attachment means including a resilient element and supported by the casing, in one position acting on the plunger in opposition to said spring to overcome the spring and hold said spindle inwardly in "in" position, said last mentioned means comprising a Z-shaped spring with one end adjustably secured on said casing and the other end bearing on said spindle to force the spindle inwardly, said spindle being reduced at its outer end to form a bearing shoulder thereon, and said opposite end of the spring being bifurcated to receive the reduced end of said spindle; and means securing said end of the spring to the casing adjustable to relieve the pressure of said spring on the spindle and permit its return to "out" position.

6. In a dial indicator: a gauge casing; a spindle movable in a defined path into said casing and having an "in" position defining one limit of travel and an "out" position defining the other limit of travel; indicator means associated with said spindle movable in ratio with the movement thereof; spring means bearing on said spindle to hold it in "out" position; attachment means including a resilient element and supported by the casing, in one position acting on the plunger in opposition to said spring to overcome the spring and hold said spindle inwardly in "in" position, said casing having a base with a tubular barrel extending substantially at right angles to the axis of said spindle; and an attachment arm tiltably supported by said barrel interjacent its ends, one end of the arm being operably connected to the spindle and said last mentioned means comprising a tubular clip received on said barrel, the clip having an extending angular spring operable by engaging said attachment arm to hold the arm in an extreme position of tilt opposite to that in which it is normally held by said first mentioned spring means and thereby to hold said spindle in "in" position.

7. A dial indicator comprising a casing; a first work engaging member; means mounting said work engaging member on said casing for movements relative to said casing between first and second limits; indicator means in said housing connected with said work engaging member for movement in response to movement of said work engaging member; spring means acting on said work engaging member and normally exerting a force thereon of such magnitude and in such direction as yieldably to maintain said work engaging member in one of its limits of movement; a second work engaging member connected internally of said casing to said first work engaging member for movement with the latter; yieldable force transmitting means having a connection with one of said work engaging members; and means mounting said yieldable force transmitting means on said casing for adjustment relative thereto so that said yieldable means exerts a force on said first work engaging member of such magnitude and in such direction as to overcome the force of said spring means and yieldably maintain said first work engaging member in its other limit of movement.

8. Means for overcoming the bias of a spindle which is substantially reciprocable in the casing of an indicating instrument comprising, a cylinder adapted to be mounted on the casing over the spindle, a plunger in said cylinder for engaging the spindle and moving it in a direction outwardly from said cylinder, and spring means maintaining said plunger in a position whereby the spindle is forced to another position.

9. The combination defined in claim 8 in which a cap threaded on said cylinder holds said spring in the cylinder and the cylinder is interiorly shouldered to limit movement of said plunger.

10. Means for overcoming the bias of a spindle which is substantially reciprocable in the casing of an indicating instrument comprising a Z-shaped spring having one end adapted to be adjustably secured to the casing, the other end of said spring being bifurcated to receive the cylinder, and the portion of said spring connecting its ends being reduced with relation thereto.

References Cited in the file of this patent

UNITED STATES PATENTS

| | | |
|---|---|---|
| 1,466,664 | Lowe | Sept. 4, 1923 |
| 2,242,151 | Sisson | May 13, 1941 |
| 2,345,845 | Wells | Apr. 4, 1944 |
| 2,400,293 | Dunn | May 14, 1946 |
| 2,483,743 | Turrettini | Oct. 4, 1949 |
| 2,527,173 | Boat | Oct. 24, 1950 |
| 2,660,799 | Strauss | Dec. 1, 1953 |

FOREIGN PATENTS

| | | |
|---|---|---|
| 125,260 | Australia | Aug. 22, 1947 |